(12) United States Patent
Jung

(10) Patent No.: US 8,982,196 B2
(45) Date of Patent: Mar. 17, 2015

(54) THREE-DIMENSIONAL IMAGE DISPLAY DEVICE

(75) Inventor: Sungmin Jung, Incheon (KR)

(73) Assignee: LG Display Co., Ltd., Seoul (KR)

(*) Notice: Subject to any disclaimer, the term of this patent is extended or adjusted under 35 U.S.C. 154(b) by 498 days.

(21) Appl. No.: 12/882,007

(22) Filed: Sep. 14, 2010

(65) Prior Publication Data
US 2011/0074773 A1    Mar. 31, 2011

(30) Foreign Application Priority Data

Sep. 29, 2009   (KR) .......................... 10-2009-092706

(51) Int. Cl.
*G02B 27/26*    (2006.01)
*G09G 3/00*    (2006.01)
*G09G 3/20*    (2006.01)
*H04N 13/04*    (2006.01)

(52) U.S. Cl.
CPC ................ *G02B 27/26* (2013.01); *G09G 3/003* (2013.01); *G09G 3/20* (2013.01); *H04N 13/0434* (2013.01); *G09G 2300/0439* (2013.01); *G09G 2310/0275* (2013.01); *G09G 2320/0209* (2013.01)
USPC ............................................ 348/58; 345/419

(58) Field of Classification Search
CPC . H04N 13/0434; H04N 13/0459; G02B 27/26
USPC ................... 348/57, 42–46, 51–55, E13.038, 348/E13.04, 58, 59; 345/34, 85–100, 7; 359/23, 465; 349/15, 33, 34
IPC ........................ H04N 13/04; H01L 33/00,29/24
See application file for complete search history.

(56) References Cited

U.S. PATENT DOCUMENTS

| | | | |
|---|---|---|---|
| 6,975,345 B1 * | 12/2005 | Lipton et al. ..................... | 348/57 |
| 2005/0151152 A1 * | 7/2005 | Miller et al. ................... | 257/103 |
| 2009/0153760 A1 * | 6/2009 | Murade ........................... | 349/39 |

FOREIGN PATENT DOCUMENTS

JP     2009025436 A    2/2009

OTHER PUBLICATIONS

Liou et al. "Shutter glasses stereo LCD with a dynamic backlight", Proc. SPIE 7237, Stereoscopic Displays and Applications XX, 72370X, Feb. 17, 2009.*
Office Action issued in corresponding Chinese Patent Application No. 201010295562.5, mailed Mar. 27, 2012.

* cited by examiner

*Primary Examiner* — Jay Au Patel
*Assistant Examiner* — Frank Huang
(74) *Attorney, Agent, or Firm* — Brinks Gilson & Lione

(57) ABSTRACT

A stereoscopic image display device comprises a display panel which is controlled so that image frame data are stored for frame intervals and are displayed for blank intervals, each of the blank interval being between the frame intervals; a polarization control panel which positioned on the display panel and converts a polarization state of light passing through the display panel; and polarization glasses which creates stereoscopic images by restricting the light converted by the polarization control panel and reaching each eye.

7 Claims, 7 Drawing Sheets

THREE-DIMENSIONAL IMAGE DISPLAY DEVICE

This application claims the benefit of Korea Patent Application No. 10-2009-092706, filed on Sep. 29, 2009, the entire contents of which is incorporated herein by reference for all purposes as if fully set forth herein.

BACKGROUND

1. Field of the Invention

This document relates to a three-dimensional image display (i.e., a stereoscopic image display device) for displaying a three-dimensional stereoscopic image.

2. Discussion of the Related Art

A stereoscopic image display device displays a stereoscopic image by using a stereoscopic technique or an autostereoscopic technique.

The stereoscopic technique, which uses a binocular parallax image between left and right eyes of a user and has a high stereoscopic effect, includes a glass method and a non-glass method which have been put to practical use. In the glass method, the binocular parallax image is displayed on a direct view-based display device or a projector by changing a polarization direction or in a time division manner, and polarization glasses or liquid crystal shutter glasses are used to implement stereoscopic images. In the non-glass method, generally, an optical plate such as a parallax barrier or the like for separating an optical axis of the binocular parallax image is provided at front surface or rear surface of a display screen.

The glass method employs a polarization control panel such as a patterned retarder for converting polarization characteristics of light between the polarization glasses and a display panel. In the glass method, a left eye image and a right eye image are alternately displayed on the display panel, and the polarization characteristics of light incident to the polarization glasses are converted by the patterned retarder. Through this operation, the glass method implements a stereoscopic image without degrading a resolution by time-dividing the left eye image and the right eye image.

However, there is a crosstalk problem generated from overlap of the left eye image and the right eye image in the stereoscopic image display device using the glasses method because of increasing cross blocks in which images between the display panel and the polarization control panel are overlapped with each other. Also, there is an inconvenience problem in the 3D display device using the glasses method because of the requirement of liquid crystal shutter glasses for perceiving a stereoscopic image.

BRIEF SUMMARY

A stereoscopic image display device comprises a display panel, which is controlled so that image frame data are stored for frame intervals and are displayed for blank intervals, each of the blank interval being between the frame intervals; a polarization control panel, which is positioned on the display panel and converts a polarization state of light passing through the display panel; and polarization glasses, which create stereoscopic images by restricting the light converted by the polarization control panel.

In the stereoscopic image display device according to the above-mentioned invention, the display panel is controlled so that [n]th image frame data is stored for [n]th frame interval, a first image corresponding to the [n]th image frame data is displayed for [n]th blank interval, [n+1]th image frame data is stored for [n+1]th frame interval, and a second image corresponding to the [n+1]th image frame data is displayed for [n+1]th blank interval.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Hereinafter, exemplary embodiments of this invention will now be described with reference to FIGS. 1 to 12.

Figure 1:
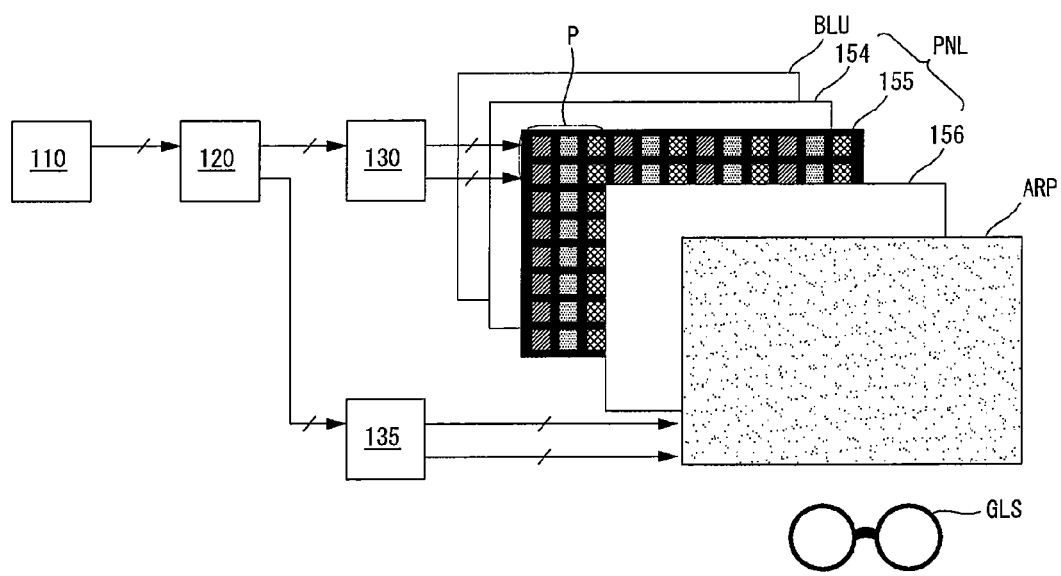
FIG. 1 illustrates a schematic diagram of a three-dimensional (3D) image display device according to a first exemplary embodiment of this document.
Figure 2:
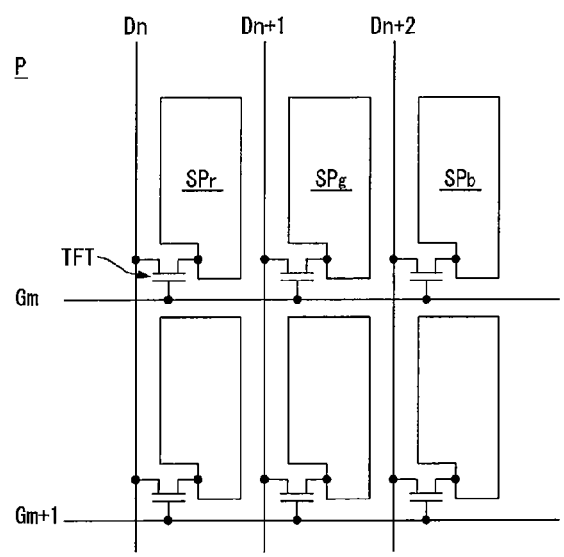
FIG. 2 illustrates a diagram showing sub-pixels of the 3D display panel shown FIG. 1.

FIG. 1 is a schematic diagram of a stereoscopic image device according to an first exemplary embodiment of this invention, FIG. 2 is a diagram showing sub-pixels of the display panel shown FIG. 1, and FIG. 3 is a diagram a schematically showing the polarization control panel of the stereoscopic image device shown in FIG. 1.

With reference to FIGS. 1 to 3, the stereoscopic image display device according to the first exemplary embodiment of the present invention includes an image supply unit 110, a controller 120, a first driving unit 130, a second driving unit 135, a display panel PNL, a polarization control panel ARP, and polarization glasses GLS.

The image supply unit 110 supplies two dimensional formatted image frame data to the controller 120 at a two-dimensional (2D) mode and supplies three dimensional formatted image frame data to the controller 120 at a three dimensional (3D) mode. The image supply unit 110 also supplies timing signals such as a vertical synchronization signal Vsync, a horizontal synchronization signal Hsync, a data enable signal DE, a clock signal CLK and so on to the controller 120. The image supply unit 110 also selects the 2D or 3D mode in response to a selection signal inputted through a user interface. The user interface includes input devices such as an on-screen display (OSD), a remote controller, a key board, a mouse and so on.

The controller 120 supplies an odd numbered image frame data (e.g., a [n]th image frame data, n is a positive integer) and even numbered image frame data (e.g., a [n+1]th image frame data) to the display panel PNL. For example, the [n]th image frame data is selected as a left eye image data and the [n+1]th image frame data is selected as a right eye image data. The controller 120 supplies the image frame data from the image supply unit 110 to the first driving unit 130 at a frame frequency of 60×m Hz (wherein, m is two or a positive integer larger than 2), for example a frame frequency of 120 Hz. The controller 120 alternately supplies the left eye image frame data and the right eye image frame data to the first driving unit 130 at the 3D mode. Also, the controller 120 multiplies the frame frequency of the input image by m, thereby increasing the frequency of the timing control signals for controlling the operation timing of the first and second driving units 130 and 135. Also, the controller 120 controls the second driving unit 135 so that voltage of scan electrodes of the polarization control panel ARP is changed from a first driving voltage to a second driving voltage. Herein the scan electrodes of the polarization control panel ARP are formed corresponding to lines of the display panel PNL in which the left (or right) eye image frame is changed into the right (or left) eye image frame.

The first driving unit 130 includes a data driving circuit connected to data lines Dn, Dn+1 and Dn+2, and a gate driving circuit connected to the gate lines Gm and Gm+1. The first driving unit 130 converts a digital image frame data from the controller 120 into a positive/negative analog image frame data, and supplies the converted data to the data lines Dn, Dn+1 and Dn+2 under a control of the controller 122. The first driving unit 130 sequentially supplies scan pluses (or gate pulses) to the gate lines Gm and Gm+1 under a control of the controller 122.

The second driver 135 shifts switching voltages Von and Voff supplied to the scan lines 164 along boundaries of the left eye image frame data and the right eye image frame data displayed on the liquid crystal panel PNL. The second driving unit 135 is implemented by a multiplexer array which selects a switching voltage Voff synchronized with the left eye image frame data displayed on the display panel PNL or a switching voltage +Von/−Von synchronized with the right eye image frame data displayed on the display panel PNL. Alternatively, The second driving unit 135 is implemented by a shift register and a level shifter for shifting an output from the level shifter to the switching voltages Voff and +Von/−Von. And also it may be implemented by any analog/digital circuit capable of supplying the switching voltages Voff and +Von/−Von to the scan electrodes of the polarization control panel ARP.

The display panel PNL stores [n]th image frame data for a [n]th frame interval, and [n+1] the image frame data for a [n+1]th frame interval. The display panel PNL is controlled so that the image frame data are stored for the frame intervals and the image frame data is displayed for a vertical blank interval (VBI) which is between the frame intervals. The display panel PNL is implemented by display devices such as a liquid crystal display (LCD), a field emission display (FED), a plasma display panel (PDP), an electroluminescence device (EL), an electrophoresis display (EPD) and so on. Hereafter, the display panel is described as the liquid crystal display panel.

The display panel PNL includes a thin film transistor (TFT) substrate 155a with TFT array formed thereon, a color filter substrate 155b with color filter array formed thereon, and a liquid crystal layer interposed between the TFT and CF substrates.

Data lines Dn to Dn+2 and gate lines Gm to Gm+1 are formed on the TFT substrate 155a to intersect each other. Also, sub-pixels SPr, SPg and Spb defined by the data and gate lines are arranged on the TFT substrate 155a in a matrix type. The TFTs formed at the intersecting area of the data lines Dn to Dn+2 and the gate lines Gm to Gm+1 are in response to scan pulses from the gate lines and supply data voltages supplied via the data lines to pixel electrodes of liquid crystal cells. For this, the TFT has a gate electrode connected the gate line Gm, a source electrode connected to the data line Dn, and a drain electrode connected to the pixel electrode of the liquid crystal cell. A common voltage is applied to a common electrode corresponding to the pixel electrode.

The CF substrate 155b includes black matrices and color filters. The common electrode is formed on the CF substrate 155b in a vertical electric field driving method such as a twisted nematic (TN) mode and a vertical alignment (VA) mode, but is formed together with the pixel electrode on the TFT substrate in a horizontal electric field driving method such as a in plane switching (IPS) mode and a fringe field switching (FFS) mode.

Lower and upper polarization films 154 and 156 are attached to lower surface of the TFT substrate 155a and upper surface of the CF substrate 155b, respectively. Also, alignment films are attached to upper surface of the TFT substrate 155a and lower surface of the CF substrate 155b of the display panel PNL to set a pre-tilt angle of liquid crystal, respectively. The upper polarization film 156 has an optical absorbing axis which is the same as that of left eye polarization filter of the polarization glasses GLS. The upper polarization film 156 determines a polarization characteristic of light incident to the polarization control panel ARP via the optical absorbing axis. The lower polarization film 154 determines a polarization characteristic of light incident to the display panel. Spacers are formed between the TFT substrate 155a and the CF substrate 155b to maintain cell gap therebetween. The display panel PNL is driven by liquid crystal driving modes including the TN, VA, IPS and FFS modes. The display panel emits light which is linear-polarized or circular-polarized by light supplied from a backlight unit BLU. The backlight unit BLU emits light for the vertical blank interval so that the image frame data stored on the display panel PNL are displayed.

Figure 3A:
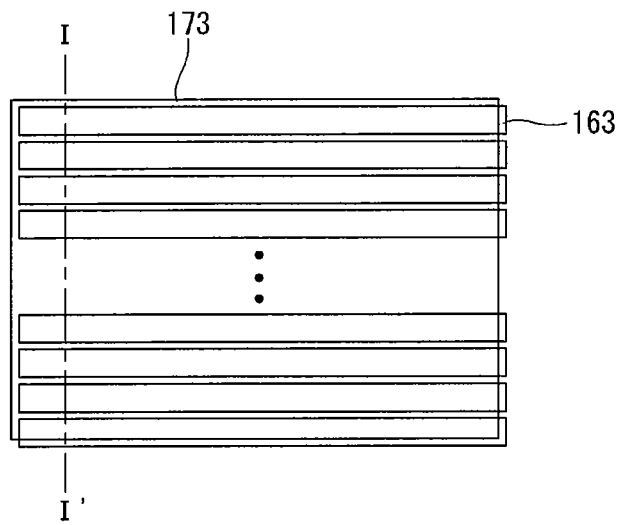
FIGS. 3A and 3B illustrates plan views schematically showing arrangement of electrodes in the polarization control panel of the stereoscopic image device shown in FIG. 1.
Figure 3B:
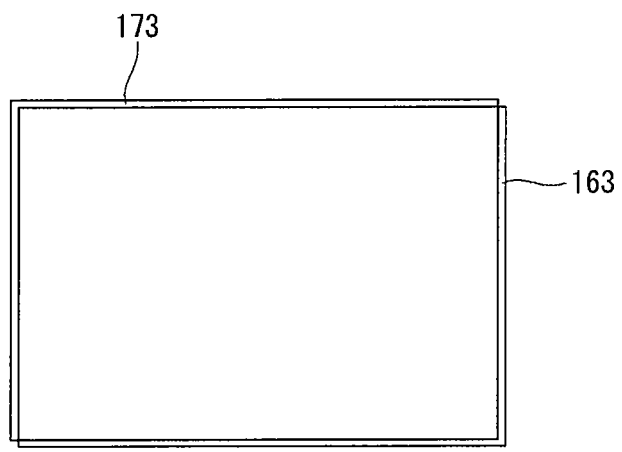
Figure 3C:
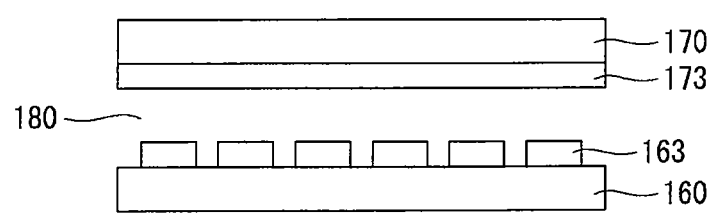
FIG. 3C illustrates a cross sectional view taken along I-I' of FIG. 3A.

The polarization control panel ARP is disposed on the liquid crystal panel PNL and alters the polarization state of the light to be orthogonal to each other every frame period. The polarization control panel ARP alters the light emitted from the liquid crystal panel PNL to have a first polarization state in response to the first driving voltage for the [n]th frame interval, and alters the light emitted from the liquid crystal panel PNL to have a second polarization state in response to the second driving voltage for the [n+1]th frame interval. As shown in FIGS. 3A to 3C, the polarization control panel ARP includes a first substrate 160 on which a scan electrode (or scan electrodes) 163 is formed, a second substrate 170 on which a common electrode 173 is formed, and a liquid crystal layer 180 disposed between the first substrate 160 and the second substrate 170. The scan electrode 163 may have a stripe shape as shown in FIG. 3A or a plate shape as shown in FIG. 3B. If the scan electrode 163 has the stripe shape as shown in FIG. 3A, the scan electrodes 163 are arranged in one direction so that each of the scan electrodes 163 corresponds to n gate lines formed on the display panel PNL (herein, n is even number). For example, if the display panel PNL has 1,080 gate lines and the polarization control panel ARP has ninety scan electrodes, one scan electrode corresponds to twelve gate lines.

The liquid crystal layer 180 includes a twisted nematic (TN) having a wave guide, an electrically controlled birefringence (ECB) having a half wave plate (λ/2), a vertical alignment (VA) having a half wave plate, a hybrid aligned nematic (HAN) having a half wave plate, and a optically compensated bend (OCB) having a half wave plate.

A common voltage is applied to the common electrode 173 of the polarization control panel ARP. The common voltage has the same electrical potential as the common voltage applied to the common electrode of the display panel PNL. The voltage Voff which has the same electrical potential as the common voltage is applied to the scan electrode 163 before (or after) right eye frame image (or left eye frame image) is displayed on lines of the display panel corresponding to the scan electrode. Subsequently, a positive/negative voltage +Von/−Von which has a predetermined voltage difference to the common voltage is applied to the scan electrode 163 before (or after) left eye frame image (or right eye frame image) is displayed on lines of the display panel corresponding to the scan electrode. Accordingly, switching voltages having three voltage levels Voff, +Von, and −Von are applied to the scan electrode 163. The positive/negative voltage +Von/−Von higher and lower than the common voltage prevents the deterioration of the liquid crystal molecules due to a DC bias.

The polarization glasses GLS are to view a stereoscopic image transmitted via the polarization control panel ARP. The polarization glasses GLS includes a left eye glass and right eye glass. The light absorbing axis of the left eye glass is different from that of the right eye glass so that the polarization characteristic of the left eye glass is different from that of the right eye glass. The polarization glasses GLS may be constructed in a various ways depending on the polarization characteristics of the display panel PNL and the polarization control panel ARP.

Hereinafter, the stereoscopic image display device according to one exemplary embodiment of this invention will be more specifically described.

Figure 4:
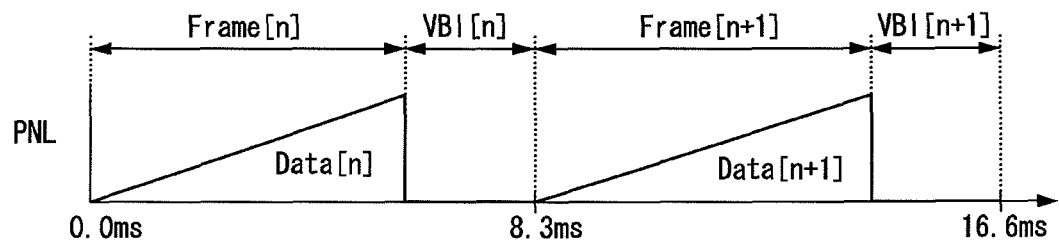
FIGS. 4 to 6 illustrates drawings for describing intervals when image frame data are stored and blank intervals.
Figure 5:
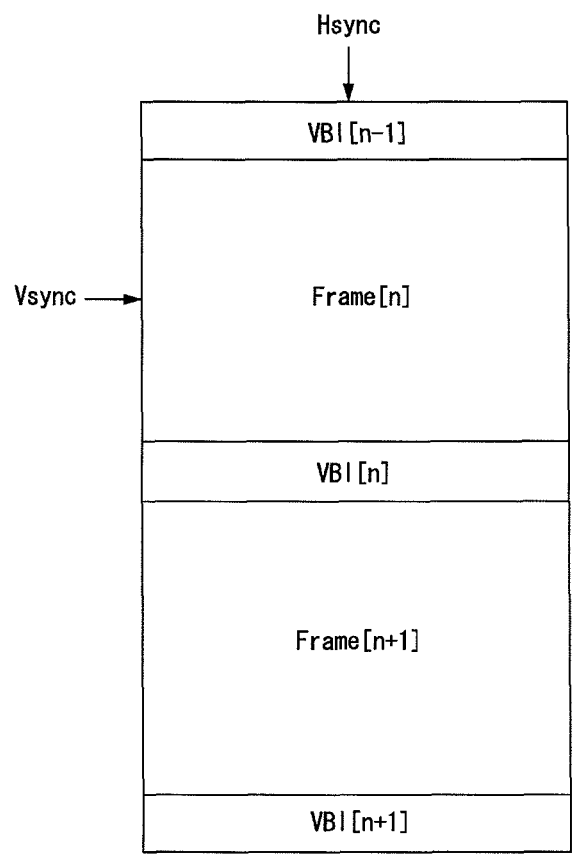
Figure 6:
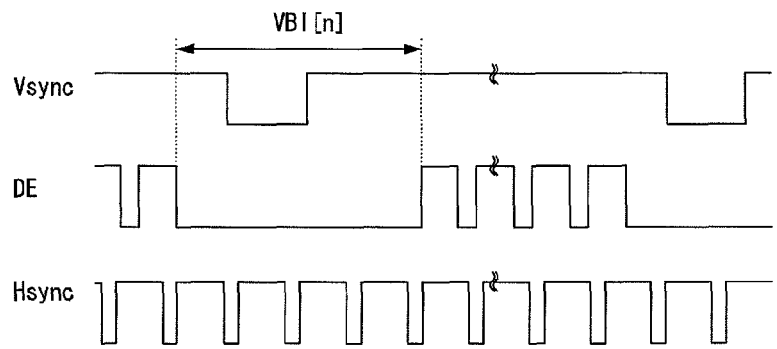
Figure 7:
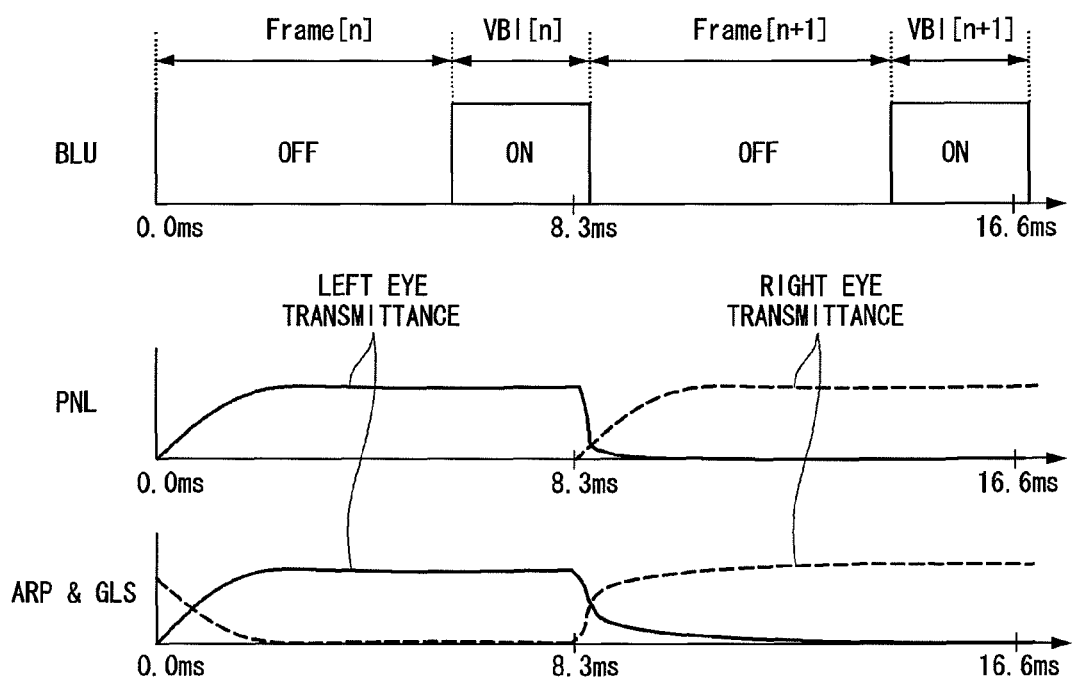
FIGS. 7 to 9 illustrates drawings for describing operations of the stereoscopic image device according to the first exemplary embodiment of this document.
Figure 8:
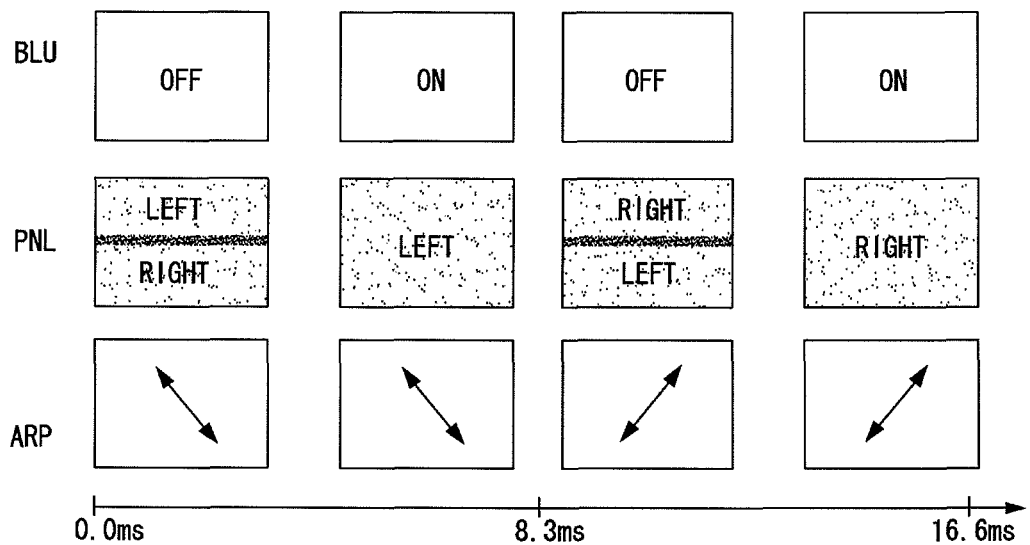
Figure 9:
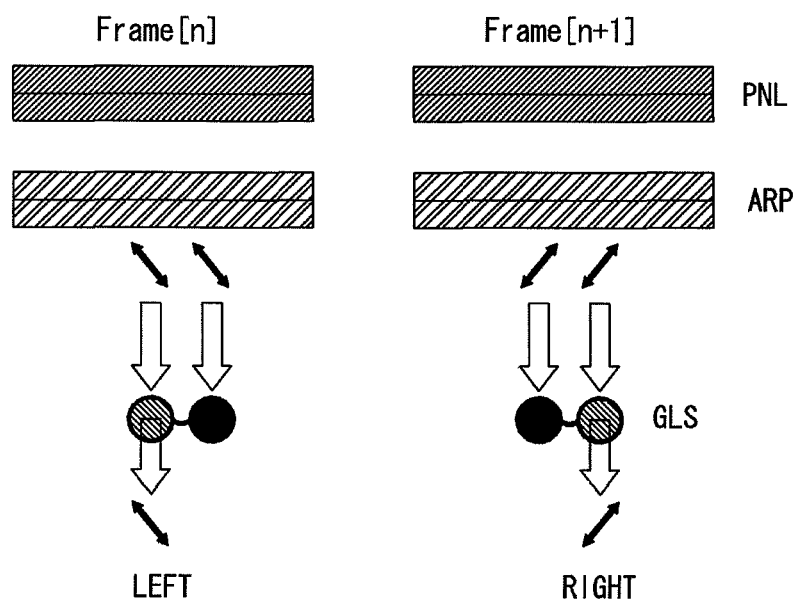

FIGS. 4 to 6 are drawings for describing intervals for storing image frame data and blank intervals, and FIGS. 7 to 9 are drawings for describing operation of the stereoscopic image display device according to first exemplary embodiment of this invention.

Referring to FIGS. 4 to 6, [n]th image frame data Data[n] is stored on the display panel for [n]th frame interval Frame[n], and [n+1]th image frame data Data[n+1] is stored on the display panel for [n+1]th frame interval Frame[n+1]. There is a blank interval VBI[n] between the [n]th frame interval Frame[n] and [n+1]th frame interval Frame[n+1]. In FIGS. 5 and 6, the frame intervals Frame[n] and Frame[n+1] are defined as intervals when data enable signal DE is supplied. The data enable signal DE is controlled so that the image frame data Data[n+1] is supplied to the display panel PNL in corresponding to the horizontal synchronization signal Hsync during the interval for supplying the vertical synchronization interval. Also, the blank intervals VBI[n] is defined as a interval between the frame intervals Frame[n] and Frame[n+1] in which the data enable signal DE (or the image frame data) is not supplied.

Referring to FIGS. 4 to 9, a backlight unit BLU emits light or does not emit light based on the frame intervals Frame[n] and Frame[n+1] and the blank intervals VBI[n] and VBI[n+1]. The display panel PNL displays the image corresponding to the [n]th image frame data Data[n] during the [n]th blank interval VBI[n] because the backlight BLU emits light to the display panel PNL during the [n]th blank interval. Thereafter, the display panel PNL displays the image corresponding to the [n+1]th image frame data Data[n] during the [n+1]th blank interval VBI[n+1] because the backlight BLU emits light to the display panel PNL during the [n+1]th blank interval. For this, the intervals when the backlight unit BLU emits light are synchronized with the blank intervals VBI[n] and VBI[n+1].

The polarization control panel ARP is converted into left eye polarization (or the right eye polarization) in response to the first driving voltage during the [n]th blank interval VBI [n], and is converted into right eye polarization (or the left eye polarization) in response to the second driving voltage during the [n+1]th blank interval VBI[n+1]. For example, the polarization control panel ARP is converted into the left polarization state to transmit a left eye image LEFT if the image corresponding to the [n]th image frame data Data[n] displayed on the display panel PNL is the left eye image LEFT. Otherwise, the polarization control panel ARP is converted into the right polarization state to transmit a right eye image RIGHT if the image corresponding to the [n+1]th image frame data Data[n+1] displayed on the display panel PNL is the right eye frame image RIGHT. For this, the interval when the polarization characteristic of the polarization control panel ARP is converted is synchronized with the display panel PNL. In other words, the polarization control panel ARP is synchronized with the interval when the image frame data is stored on the display panel PNL, that is, the frame intervals Frame[n], Frame[n+1]. If the interval when the polarization characteristic of the polarization control panel ARP is converted is synchronized with the frame intervals Frame[n], Frame[n+1], the polarization control panel ARP is converted into the left eye polarization or right eye polarization before the backlight unit BLU supplies the light to the display panel PNL. In this case, although the response speed when the polarization characteristic of the polarization control panel ARP is converted is late, it is possible to prevent the image (or light) passing through the backlight unit BLU and the display panel PNL from being delayed or disappeared. Accordingly, it is possible to improve the crosstalk problem generated between the left and right eye images when the stereoscopic device is implemented The polarization glasses GLS distinguishably transmit the left eye image LEFT or the right image RIGHT passing through the polarization control panel ARP if the polarization state of the polarization control panel ARP is converted as above-mentioned. Accordingly, transmittance for the left and right eye image in the polarization control panel ARP may be illustrated as the same as that in the polarization glasses GLS as shown in FIG. 7. FIG. 7 illustrates transmittance status of light for the display panel PNL, the polarization control panel ARP and the polarization glasses GLS on the basis when the backlight unit BLU emits the light. In FIG. 7, a dashed line indicates a left eye transmittance and a solid line indicates a right eye transmittance. In FIG. 7, although the light emitting interval of the backlight unit BLU exceeds 8.3 ms, but it is not limited thereto. The excess time is a predetermined delayed time which may be generated when a stereoscopic image is implemented. The light emitting interval of the backlight unit BLU may be adjusted before the reference time 8.3 ms.

If the backlight unit BLU, the display panel PNL and the polarization control panel ARP are constructed as above-mentioned, it is possible to serve the backlight unit BLU as a liquid crystal shutter glasses of the stereoscopic image display.

Hitherto, the stereoscopic image display device using the liquid crystal display is described as one embodiment. But this invention is not limited thereto. If the image frame data is stored on the display panel for a frame interval and the image data is displayed for a blank interval VBI, it is possible for this invention to be applied to any stereoscopic image display device using other display panel such as plasma display panel, electroluminescence display panel and so on.

Hereinafter, there will be described for the stereoscopic image display device using the electroluminescence display panel as a varied embodiment.

Figure 10:
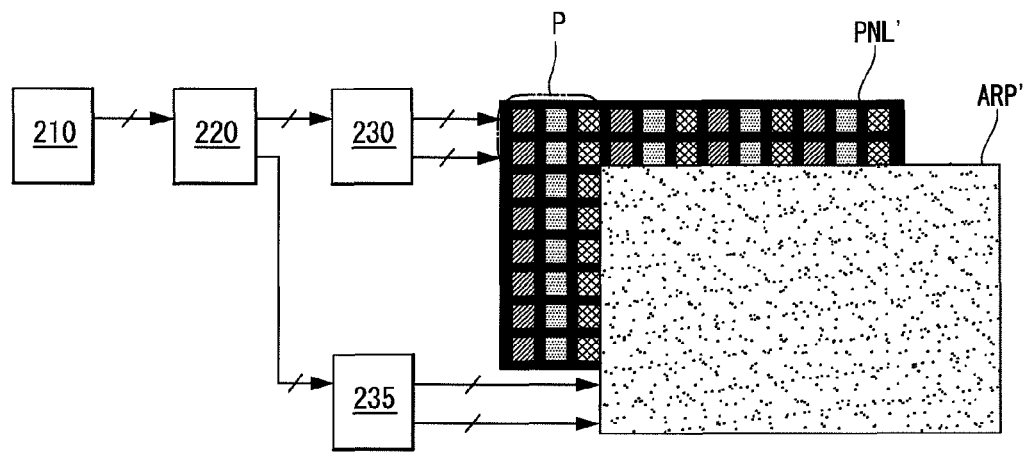
FIG. 10 illustrates a stereoscopic image display using an organic electroluminescence display panel according to a second exemplary embodiment of this document.
Figure 10:
Figure 11:
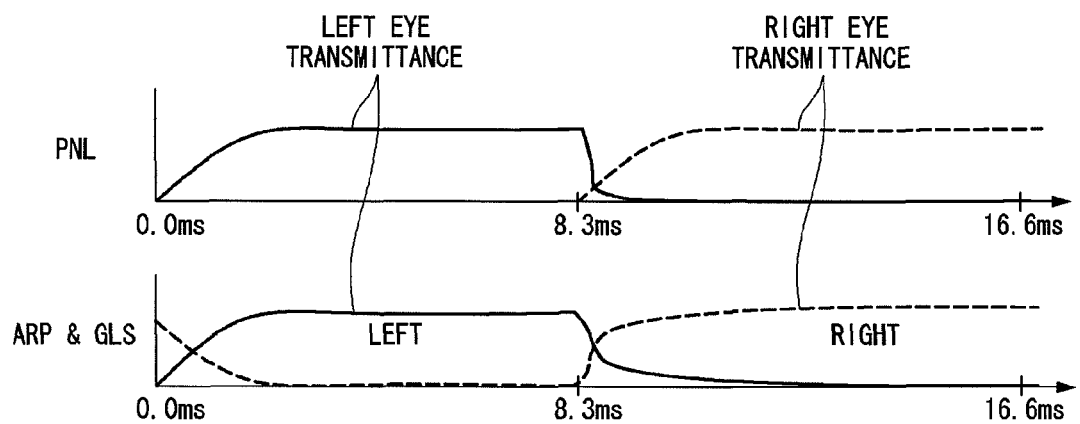
FIG. 11 illustrates a drawing for describing operation of the stereoscopic image display device shown in FIG. 10.
Figure 12:
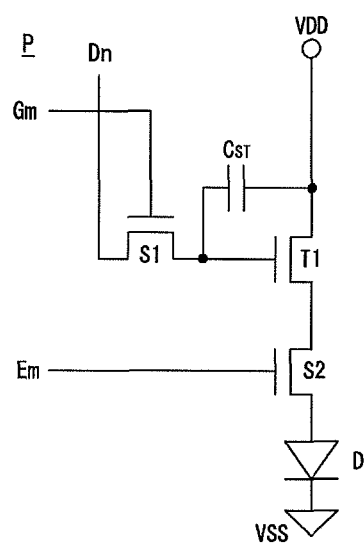
FIG. 12 illustrates an equivalent circuit of a sub-pixel of organic electroluminescence element applied to the stereoscopic image display device shown in FIG. 10.

FIG. 10 illustrates a stereoscopic image display using an organic electroluminescence display panel according to a second exemplary embodiment of this document, FIG. 11 illustrates a drawing for describing operation of the stereoscopic image display device shown in FIG. 10, and FIG. 12 illustrates an equivalent circuit of a sub-pixel of organic electroluminescence element applied to the stereoscopic image display device shown in FIG. 10.

Referring to FIG. 10, the stereoscopic image display according to the another embodiment of this document includes an image supplying unit 210, a controller 220, a first driving unit 230, a second driving unit 235, a display panel PNL, a polarization control panel ARP, and polarization glasses GLS. In the second embodiment shown FIG. 10, the display panel PNL includes an organic electroluminescent display panel. The description for the image supplying unit 210, the controller 220, the first driving unit 230, the second driving unit 235, the display panel PNL, the polarization control panel ARP, and the polarization glasses GLS is omitted because they are substantially the same as that of the stereoscopic image display device described in the first embodiment.

Referring to FIGS. 4, 11 and 12, the stereoscopic image display device includes the organic electroluminescent display panel on which the [n]th image frame data Data[n] is stored for [n]th blanking interval VBI[n] and [n+1]th image frame data Data[n+1] is stored for [n+1]th blanking interval VBI [n+1]. In this embodiment, the organic electroluminescent display panel does not include a backlight unit and a light source because it has self light-emitting elements. Accordingly, the organic electroluminescent display panel is controlled so that the [n]th image frame data Data[n] is displayed for the [n]th blank interval VBI[n] and the [n+1]th image frame data Data[n+1] is displayed for the [n+1] the blank interval VBI[n+1]. For this, in the sub-pixel of the organic electroluminescent display panel, a control transistor S2 is used on behalf of the backlight unit of the stereoscopic image display according to the first embodiment of this document.

Hereinafter, the sub-pixel P of the display panel according to the second embodiment of this document will be described more in detail.

The sub-pixel P includes a switching transistor S1, a driving transistor T1, a capacitor Cst, a control transistor S2 and a light emitting diode D.

The switching transistor S1 supplies the image frame data from the data line Dn to the capacitor Cst in response to a scan pulse supplied to the gate line Gm. The capacitor Cst stores the image frame data from the data line Dn as a data voltage. The driving transistor T1 is driven by the data voltage stored on the capacitor Cst. The control transistor S2 controls a light emitting time of the light emitting diode D in response to a control signal from the control line Em so that the current supplied from the first power source VDD during a blank interval is flowing to the second power source VSS through the light emitting diode D.

The light emitting diode D included the sub-pixel P is operated to emit light for the interval when the control transistor S2 is driven even though the driving transistor T1 is driven. That is, the light emitting diode D emits light for the blank interval VBI. Accordingly, if all control transistors of sub-pixels included the display panel is connected with one control line Em, all light emitting diodes included the display panel emits light for the blank interval VBI.

In the second embodiment of this document, it is possible to implement the stereoscopic image display having functions as the same as that of the first embodiment of this document because the control transistor S2 can be in place of the backlight unit of the first embodiment. Also, in the second embodiment, although the sub-pixel P includes two transistors S1 and T1 and one capacitor Cst as well as one control transistor S2, but the invention of this document is not limited thereto. For example, other display panels may be applied to the stereoscopic image display device of this document without requiring a liquid crystal shutter glasses if it is possible to control the stereoscopic image display so that an image is displayed on the display panel for the blank interval VBI.

As described above, according to this document, it is possible to provide the stereoscopic image display device capable of improving the crosstalk between the images for the left eye and the images for the right eye and increasing the image quality of the stereoscopic images. And also, it is possible to improve user convenience because of without requiring liquid crystal shutter glasses for perceiving a stereoscopic image.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A stereoscopic image display device comprising:
   a display panel including gate lines and data lines crossing over each other, thin film transistors (TFTs) formed at crossing areas of the gate and data lines, pixel electrodes connected to the TFTs defined by the gate and data lines, and a common electrode of the display panel corresponding to the pixel electrodes, the display panel being controlled so that image frame data are stored on the display panel for frame intervals;
   a polarization control panel, which is separate from the display panel and positioned on the display panel and converts a polarization state of light passing through the display panel according to a first driving voltage and a second driving voltage, wherein the polarization control panel is synchronized with the intervals when the image frame data is stored on the display panel;
   a backlight unit emitting light during blank intervals between the frame intervals such that the display panel displays the image frame data only during the blank intervals after the polarization control panel is converted into one of a left eye polarization state and a right eye polarization state, wherein the blank intervals are vertical intervals in which the image frame data and data enable signals are not supplied; and
   polarization glasses, which create stereoscopic images by restricting the light converted by the polarization control panel,
   wherein the polarization control panel includes a first substrate on which at least one scan electrode is formed, a second substrate on which a common electrode of the polarization control panel is formed, and a liquid crystal layer disposed therebetween,
   wherein a common voltage is applied to the common electrode of the display panel and the common electrode of the polarization control panel, and wherein the first driving voltage is any one of a positive voltage and a negative voltage having a predetermined voltage difference to the common voltage, the second driving voltage is another one of the positive and negative voltages, and the first and second driving voltage are applied to the scan electrode of the polarization control panel, wherein the polarization control panel is converted into one of the left eye polarization state and the right eye polarization state in response to the first driving voltage and converted into the other one of the left eye polarization state and the right eye polarization state in response to the second driving voltage before the backlight unit supplies the light to the display panel, and wherein the back light unit emits the light for a light emitting interval exceeding a reference time and the reference time is a predetermined delayed time generated when a stereoscopic image is displayed and the reference time is less than half the sum of the frame interval and the blank interval.

2. The stereoscopic image display device of claim 1, wherein the display panel is controlled so that [n]th image frame data is stored for [n]th frame interval, a first image corresponding to the [n]th image frame data is displayed for [n]th blank interval, [n+1]th image frame data is stored for [n+1]th frame interval, and a second image corresponding to the [n+1]th image frame data is displayed for [n+1]th blank interval.

3. The stereoscopic image display device of claim 1, wherein the polarization control panel converts the polarization state of the light passing through the display panel for each frame interval.

4. The stereoscopic image display device of claim 1, wherein the polarization control panel converts the polarization state of the light passing through the display panel into a right eye polarization for the [n]th blank interval and a left eye polarization for the [n+1]th blank interval.

5. A stereoscopic image display device comprising:
an electroluminescent display panel including gate lines and data lines crossing over each other, and pixels defined by crossings of the gate and data lines, and the electroluminescent display panel being controlled so that image frame data are stored on the display panel for frame intervals;
a polarization control panel, which is separate from the display panel and positioned on the display panel and converts a polarization state of light passing through the display panel according to a first driving voltage and a second driving voltage, wherein the polarization control panel is synchronized with the intervals when the image frame data is stored on the display panel;
a backlight unit emitting light during blank intervals between the frame intervals such that the display panel displays the image frame data only during the blank intervals after the polarization control panel is converted into one of a left eye polarization state and a right eye polarization state, wherein the blank intervals are vertical intervals in which the image frame data and data enable signals are not supplied; and
polarization glasses, which create stereoscopic images by restricting the light converted by the polarization control panel, wherein each of the pixels includes a switching thin film transistor (TFT) configured to supply a data signal responding to a gate line signal, a capacitor configured to store the data signal from the switching TFT, a driving TFT configured to supply a current from the first power source responding to the data signal stored on the capacitor, and a control TFT configured to supply the current from the driving TFT to an light emitting diode responding to a control signal, wherein the polarization control panel includes a first substrate on which at least one scan electrode is formed, a second substrate on which a common electrode of the polarization control panel is formed, and a liquid crystal layer disposed therebetween, wherein a common voltage is applied to a first electrode of the light emitting diode and the common electrode of the polarization control panel, wherein the first driving voltage is any one of a positive voltage and a negative voltage having a predetermined voltage difference to the common voltage, the second driving voltage is another one of the positive and negative voltages, and the first and second driving voltage are applied to the scan electrode of the polarization control panel, wherein the polarization control panel is converted into one of the left eye polarization state and the right eye polarization state in response to the first driving voltage and converted into the other one of the left eye polarization state and the right eye polarization state in response to the second driving voltage before the backlight unit supplies the light to the electroluminescent display panel, and wherein the backlight unit emits the light for a light emitting interval exceeding a reference time and the reference time is a predetermined delayed time generated when a stereoscopic image is displayed and the reference time is less than half the sum of the frame interval and the blank interval.

6. The stereoscopic image display device of claim 5, wherein the gate line signal is a scan pulse supplied to the gate line.

7. The stereoscopic image display device of claim 6, wherein the control signal is substantially simultaneously supplied to all of the control TFTs in the pixels so that all of the light emit diodes in the pixels emits light for the blank interval.

* * * * *